(12) United States Patent
Lee

(10) Patent No.: US 9,438,056 B2
(45) Date of Patent: Sep. 6, 2016

(54) BATTERY PACK, BATTERY APPARATUS INCLUDING THE SAME, AND CELL BALANCING METHOD THEREOF

(71) Applicant: SNU R&DB FOUNDATION, Seoul (KR)

(72) Inventor: Jung Woo Lee, Seoul (KR)

(73) Assignee: SNU R&DB FOUNDATION, Seoul (KR)

( * ) Notice: Subject to any disclaimer, the term of this patent is extended or adjusted under 35 U.S.C. 154(b) by 244 days.

(21) Appl. No.: 13/748,213

(22) Filed: Jan. 23, 2013

(65) Prior Publication Data

US 2014/0055079 A1   Feb. 27, 2014

(30) Foreign Application Priority Data

Aug. 24, 2012   (KR) .................. 10-2012-0093184

(51) Int. Cl.
  *H02J 7/14*   (2006.01)
  *H02J 7/00*   (2006.01)
  *B60L 11/18*   (2006.01)

(52) U.S. Cl.
  CPC .......... *H02J 7/0054* (2013.01); *B60L 11/1859* (2013.01); *B60L 11/1861* (2013.01); *B60L 11/1866* (2013.01); *H02J 7/0014* (2013.01); *H02J 7/0042* (2013.01); *B60L 2240/547* (2013.01); *H02J 7/0016* (2013.01); *Y02T 10/7005* (2013.01); *Y02T 10/7044* (2013.01); *Y02T 10/7055* (2013.01); *Y02T 10/7061* (2013.01)

(58) Field of Classification Search
  USPC ........ 320/103, 106, 107, 108, 109, 116, 137
  See application file for complete search history.

(56) References Cited

U.S. PATENT DOCUMENTS

| | | | |
|---|---|---|---|
| 6,208,115 B1* | 3/2001 | Binder | 320/108 |
| 2010/0237709 A1* | 9/2010 | Hall | B60L 11/182 307/104 |
| 2010/0308767 A1* | 12/2010 | Rofougaran et al. | 320/108 |
| 2011/0127960 A1* | 6/2011 | Plett | 320/116 |
| 2012/0112685 A1* | 5/2012 | Hartley et al. | 320/106 |
| 2012/0133335 A1* | 5/2012 | Tanabe | 320/137 |
| 2012/0206102 A1* | 8/2012 | Okamura et al. | 320/112 |

* cited by examiner

*Primary Examiner* — Brian Ngo
(74) *Attorney, Agent, or Firm* — William Park & Associates Ltd.

(57) ABSTRACT

A battery pack includes: a cell module including a plurality of battery cells; an antenna connected to each of the battery cells; and a waveguide installed at one side of the cell module and having the antenna housed therein.

10 Claims, 2 Drawing Sheets

BATTERY PACK, BATTERY APPARATUS INCLUDING THE SAME, AND CELL BALANCING METHOD THEREOF

CROSS-REFERENCES TO RELATED APPLICATION

The present application claims priority under 35 U.S.C. §119(a) to Korean application number 10-2012-0093184, filed on Aug. 24, 2012, in the Korean Intellectual Property Office, which is incorporated herein by reference in its entirety.

BACKGROUND

1. Technical Field

The present invention relates to an energy storing apparatus, and more particularly, to a battery pack, a battery apparatus including the same, and a cell balancing method thereof.

2. Related Art

Starting from a hybrid electric vehicle (HEV), an electric vehicle (EV) has developed to a plug-in hybrid electric vehicle (PHEV). Furthermore, the development and management of a battery serving as a power source is one of main concerns of the EV market, and many battery makers are devoting all their strength to preoccupy new techniques.

Recently, much attention has been paid to a smart grid which is an intelligent electric power network system in which a supplier and a consumer interact with each other through information communication technology combined with production, transport, and consumption processes for electricity, thereby increasing efficiency.

The EV or smart grid uses a large-capacity energy storing apparatus, and a battery pack configured by connecting a plurality of cells, for example, 10 to 1,000 cells is used as a power source. Since a large-capacity battery includes a plurality of cells, an imbalance of state of charge (SOC) may occur between the cells, due to characteristic and temperature differences between the cells. The imbalance of SOC has a bad effect on the entire battery performance. In order to solve such a problem, power needs to be transferred from a cell having a high SOC and a cell having a low SOC. Such a power transfer method is referred to as active cell balancing.

Currently, a wired method is used as the cell balancing method. That is, power is transmitted from one cell to another cell through a wire using a switch controlled by a battery controller. In the wired cell balancing method, however, when the number of cells increases to several tens or more, the connection between the wire and the switch becomes very complex. Furthermore, since a large number of manual operations are required during a manufacturing process, the manufacturing cost increases.

Therefore, more advanced technology is urgently required for a cell balancing method of a large-capacity battery apparatus.

SUMMARY

In one embodiment of the present invention, a battery pack includes: a cell module including a plurality of battery cells; an antenna connected to each of the battery cells; and a waveguide (resonator) installed at one side of the cell module and having the antenna housed therein.

In another embodiment of the present invention, a battery apparatus includes: a cell module including a plurality of battery cells each having an antenna provided therein; a waveguide (resonator) installed at one side of the cell module and having the antenna housed therein; and a BMS configured to select a transmitting cell and one or more receiving cells based on states of charge (SOC) of the respective cells, and form an electromagnetic wave transmission/reception path between an antenna connected to the transmitting cell and antennas connected to the one or more receiving cells.

In another embodiment of the present invention, there is provided a cell balancing method of a battery apparatus which includes a cell module including a plurality of battery cells each having an antenna provided therein, a waveguide (resonator) installed at one side of the cell module and having the antenna housed therein, and a BMS connected between the battery cell and the antenna. The cell balancing method includes the steps of: measuring, by the BMS, SOC of the respective cells included in the cell module; determining, by the BMS, a transmitting cell and one or more receiving cells based on the SOC measurement results; and forming, by the BMS, an electromagnetic wave path such that an antenna connected to the transmitting cell and antennas connected to the one or more receiving cells perform wireless power transmission.

BRIEF DESCRIPTION OF THE DRAWINGS

Features, aspects, and embodiments are described in conjunction with the attached drawings, in which.

DETAILED DESCRIPTION

Hereinafter, a battery pack, a battery apparatus including the same, and a cell balancing method according to the present invention will be described below with reference to the accompanying drawings through exemplary embodiments.

Figure 1:
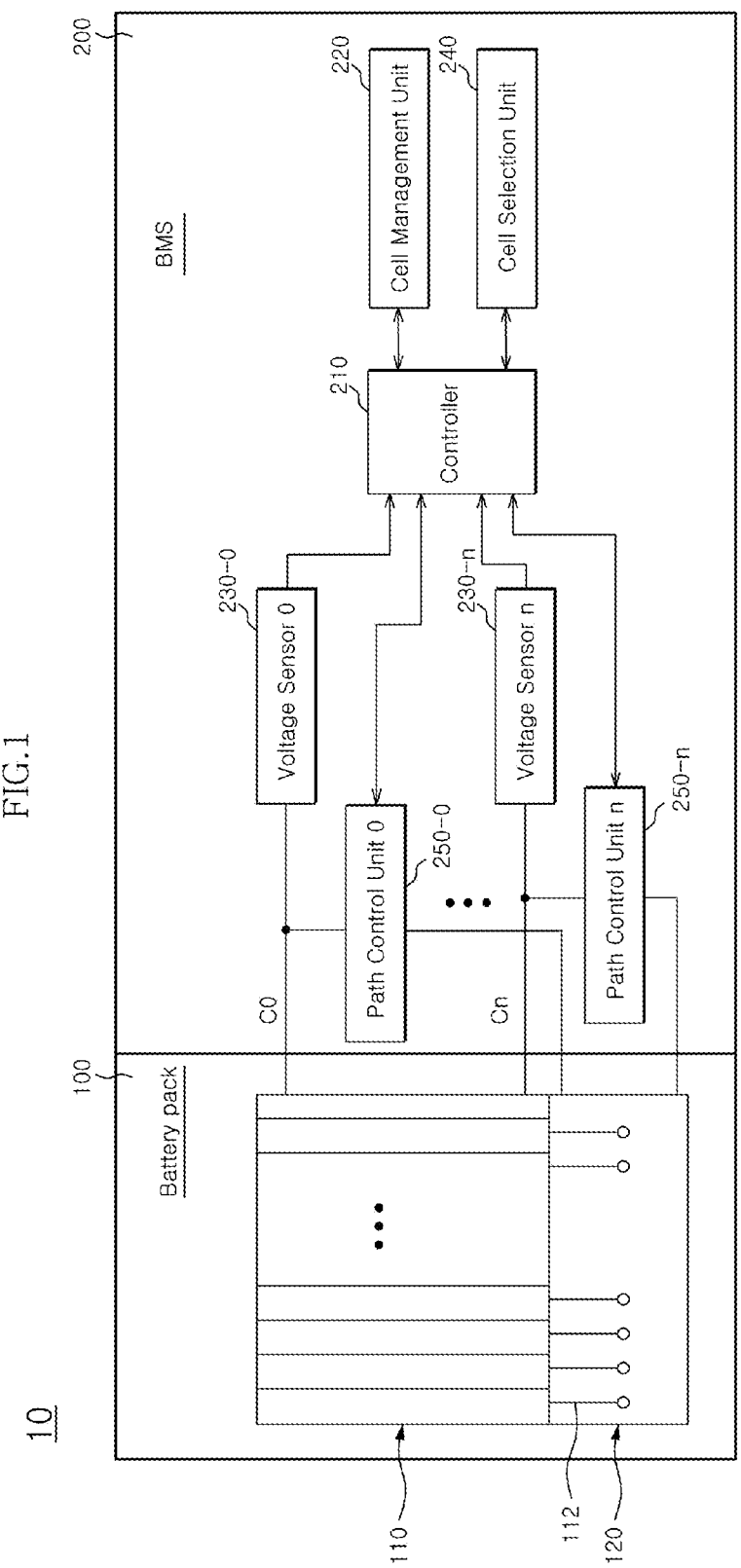
FIG. 1 is a configuration diagram of a battery apparatus according to one embodiment of the present invention.

FIG. 1 is a configuration diagram of a battery apparatus according to one embodiment of the present invention.

Referring to FIG. 1, the battery apparatus 10 according to the embodiment of the present invention may include a battery pack 100 and a battery management system (BMS) 200.

The battery pack 100 includes a cell module 110 and a waveguide 120. The cell module 110 includes a plurality of battery cells arranged therein, each of which has an antenna 112. The antennas 112 provided in the respective cells are housed in the waveguide 120.

Each of the cells has a case formed of a metal such as aluminum or a material such as synthetic resin. Furthermore, the exterior of the cell has a rectangular parallelepiped shape such as a box shape, and the plurality of cells are erected and installed at a predetermined distance from each other so as to operate as a large-capacity energy storing apparatus. Each of the cells may include a lithium-on battery.

The waveguide 120 may have a closed structure formed of a metal. Furthermore, the waveguide 120 may be formed at one side of the cell module 110, or desirably, on the bottom surface of the cell module 110, but the present invention is not limited thereto. Accordingly, wireless power transmission may be performed through the antennas 112 provided in the respective cells inside the waveguide 120.

Meanwhile, the BMS 200 may include a controller 210, a cell management unit 200, a plurality of voltage sensors 230-0 to 230-$n$, a cell selection unit 240, and a plurality of path control units 250-0 to 250-$n$.

Basically, the BMS 200 monitors the state of a battery, and prevents overcharge and overdischarge of the battery such that the battery may be maintained and used under an optimal condition. Furthermore, the BMS 200 performs an energy storage input/output function, a power control function, a cell balancing function and the like such that the battery apparatus 10 is automatically managed. Furthermore, the BMS 200 may estimate a replacement time of the battery and previously discover a battery having a problem. FIG. 1 selectively illustrates only components required for cell balancing.

The cell balancing may be performed during a rest period in which the battery apparatus is neither charged nor discharged.

More specifically, the cell management unit 220 is configured to store and manage the IDs of the respective cells included in the cell module 110. The voltage sensors 230-0 to 230-$n$ are configured to measure the SOC of the respective cells and provide the measured SOC to the controller 210.

The controller 210 is configured to determine whether cell balancing is required or not, according to the SOC received from the voltage sensors 230-0 to 230-$n$. Furthermore, the cell selection unit 240 is configured to select any one transmitting cell and one or more receiving cell based on the SOC of the respective cells.

Here, the transmitting cell may include a cell of which the SOC is the highest. Furthermore, the one or more receiving cells may include a predetermined number of cells from a cell of which the SOC is the lowest.

The path control units 250-0 to 250-$n$ are switched by the controller 210 as the transmitting and receiving cells are selected by the cell selection unit 240. Then, the transmitting cell transmits power through the antenna thereof, and the one or more receiving cells receive power from the transmitting cell through the antennas thereof.

Figure 2:
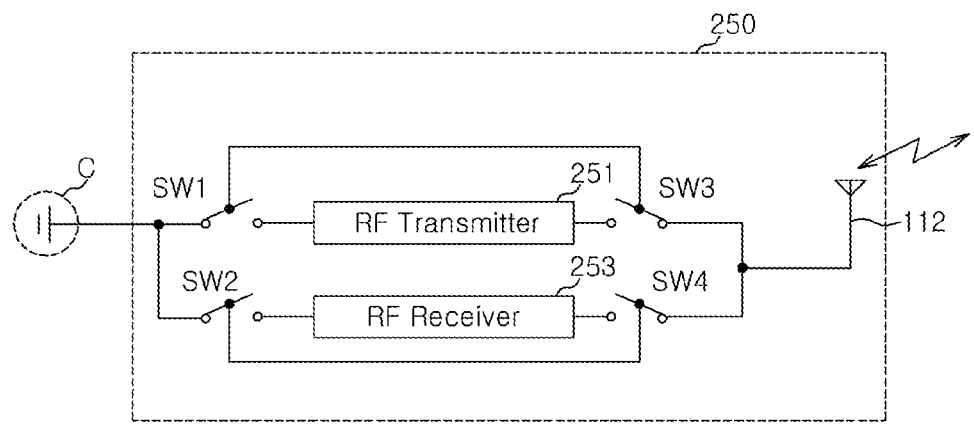
FIG. 2 is a diagram for explaining the configuration of a path control unit of FIG. 1 and a cell balancing concept using the path control unit.

FIG. 2 is a diagram for explaining the configuration of the path control unit of FIG. 1 and the cell balancing concept using the path control unit.

First, the path control unit 250 includes a first switch SW1, an RF transmitter 251, a third switch SW3, a second switch SW2, an RF receiver 253, and a fourth switch SW4. The first switch SW1 is connected to any one electrode (for example, cathode) of a cell C. The RF transmitter 251 is connected to the first switch SW1. The third switch SW3 is connected to a transmitting terminal of the RF transmitter 251 and turned on/off in connection with the first switch SW1. The second switch is connected to the electrode of the cell C in parallel to the first switch SW1. The RF receiver 253 is connected to the second switch SW2. The fourth switch SW4 is connected to a receiving terminal of the RF receiver 253 and turned on/off in connection with the second switch SW. Furthermore, one ends of the third and fourth switches SW3 and SW4 are commonly connected to the antenna.

Each of the cells basically uses DC power. Therefore, in the case of the transmitting cell to transmit power, the RF transmitter 251 converts the power into electromagnetic waves and transmits the converted electromagnetic waves. Furthermore, in the case of the receiving cell, the RF receiver 253 receives the electromagnetic waves, changes the received electromagnetic waves into DC power, and then provides the DC power to the cell.

The first and third switches SW1 and SW3 transit to an on state when the corresponding cell C is selected as the transmitting cell, and the second and fourth switches SW2 and SW4 transit to an on state when the corresponding cell C is selected as the receiving cell.

Therefore, when any one cell is selected as the transmitting cell, the first and second third switches SW1 and SW3 transit to the on state, and power discharged from the corresponding transmitting cell is converted into electromagnetic waves by the RF transmitter 251 and then transmitted through the antenna 112. Furthermore, the second and fourth switches SW2 and SW4 of the path control unit connected to the cell selected as the receiving cell transit to the on state, and electromagnetic waves transmitted from the transmitting cell are received by the RF receiver 253 through the antenna 112 and converted into DC power. Accordingly, the receiving cell is charged.

As such, the wireless power transmission between the respective cells is performed through the antenna 112 installed in the waveguide 120, and the size of the waveguide 120 has a close relationship with the wavelength of electromagnetic waves to be used.

According to TE01 mode of the waveguide electromagnetism theory, the shielded waveguide 120 must have a height corresponding to ½ of wavelength, that is, $\lambda/2$. Therefore, in order to reduce the size of the waveguide 120, the frequency of the used electromagnetic waves needs to be increased because f=light speed/$\lambda$. For example, when a frequency of 1 to 2 GHz is used, the height of the waveguide may be adjusted to 15 to 17 cm.

Meanwhile, the antenna 112 applied to the embodiment of the present invention may include a half-wavelength dipole antenna or $\lambda/4$ vertical antenna, but is not limited thereto. However, since the size of the waveguide is fixed, all of the antennas provided in the respective cells must have the same wavelength. The length of the antennas may be adjusted depending on the wavelength.

Figure 3:
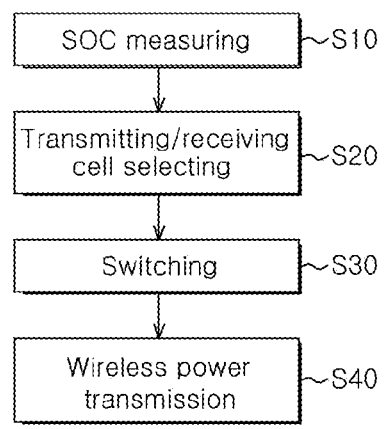
FIG. 3 is a flow chart for explaining a cell balancing method according to an embodiment of the present invention.

FIG. 3 is a flow chart for explaining a cell balancing method according to an embodiment of the present invention.

First, the voltage sensors 230-0 to 230-$n$ of the BMS 200 measure the SOC of the respective cells included in the cell module 110 according to the control of the controller 210 at step S10. The controller 210 provides the measurement results of the voltage sensors 230-0 to 230-$n$ to the cell selection unit 240, and the cell selection unit 240 determines one transmitting cell and one or more receiving cells at step S20. Here, the transmitting cell may be selected as a cell of which the SOC is the highest, and the receiving cells may be selected as a designated number of cells from a cell of which the SOC is the lowest.

Then, the controller 210 controls the switches SW1 to SW4 provided in the path control units of the transmitting cell and the receiving cells selected by the cell selection unit 240, and forms a current path at step S30.

Accordingly, the power of the transmitting cell is converted into electromagnetic waves and transmitted through the antenna. In the receiving cell, the power received through the antenna is converted into DC power by the RF receiver, and then inputted to charge the cell at step S40.

In the existing wired cell balancing method, power may be transmitted from one cell only to another cell through the switch structure. In the wireless cell balancing method according to the embodiment of the present invention, however, power may be transmitted from one cell to a plurality of cells, which makes it possible to reduce the cell balancing time. Furthermore, since the electromagnetic energy cannot escape from the waveguide, the wireless power transmission efficiency may be improved.

Furthermore, when a new cell is to be installed, an antenna may be added to an existing cell. Therefore, scalability is improved, for example, various sizes of batteries may be easily manufactured.

While certain embodiments have been described above, it will be understood to those skilled in the art that the embodiments described are by way of example only. Accordingly, the battery apparatus described herein should not be limited based on the described embodiments. Rather, the battery apparatus described herein should only be limited in light of the claims that follow when taken in conjunction with the above description and accompanying drawings.

What is claimed is:

1. A battery pack comprising:
    a cell module comprising a plurality of battery cells;
    an antenna connected to each of the battery cells; and
    a waveguide installed at one side of the cell module and having the antenna housed therein,
    wherein the antenna is configured to transmit and receive electromagnetic waves within the waveguide,
    wherein the waveguide has a height corresponding to ½ of the wavelength of the electromagnetic waves transmitted to or received from the antenna.

2. The battery pack according to claim 1, wherein the antenna is configured to transmit or receive electromagnetic waves according to control of a battery management system (BMS).

3. A battery apparatus comprising:
    a cell module comprising a plurality of battery cells each having an antenna provided therein;
    a waveguide installed at one side of the cell module and having the antenna housed therein; and
    a BMS configured to select a transmitting cell and one or more receiving cells based on states of charge (SOC) of the respective cells, and form an electromagnetic wave transmission/reception path between an antenna connected to the transmitting cell and antennas connected to the one or more receiving cells,
    wherein the antenna is configured to transmit and receive electromagnetic waves within the waveguide,
    wherein the wavequide has a height corresponding to ½ of the wavelength of the electromagnetic waves transmitted to or received from the antenna.

4. The battery apparatus according to claim 3, wherein the BMS comprises:
    a cell management unit configured to manage IDs of the respective cells;
    a voltage sensor configured to measure the SOC of each of the battery cells;
    a cell selection unit configured to select a transmitting cell and one or more receiving cells based on the measurement result of the voltage sensor, when cell balancing is required; and
    a path control unit connected between each battery cell and the antenna, and configured to form an electromagnetic wave path such that the antenna connected to the transmitting cell and the antennas connected to the one or more receiving cells perform wireless power transmission therebetween.

5. The battery apparatus according to claim 4, wherein the cell selection unit selects a cell having the highest SOC as the transmitting cell.

6. The battery apparatus according to claim 4, wherein the cell selection unit selects the receiving cells by a designed number of receiving cells from a cell having the lowest SOC.

7. The battery apparatus according to claim 4, wherein the path control unit comprises:
    a first switch connected to a first electrode of the battery cell;
    an RF receiver connected to the first switch;
    a third switch connected to a transmitting terminal of the RF transmitter and turned on or off in connection with the first switch;
    a second switch connected to the first electrode of the battery cell in parallel to the first switch;
    an RF receiver connected to the second switch; and
    a fourth switch connected to a receiving terminal of the RF receiver and turned on or off in connection with the second switch, and
    one ends of the third and fourth switches are commonly connected to the antenna.

8. A cell balancing method of a battery apparatus which includes a cell module including a plurality of battery cells each having an antenna provided therein, a waveguide installed at one side of the cell module and having the antenna housed therein, and a BMS connected between the battery cell and the antenna, the cell balancing method comprising the steps of:
    measuring, by the BMS, SOC of the respective cells included in the cell module;
    determining, by the BMS, a transmitting cell and one or more receiving cells based on the SOC measurement results;
    forming, by the BMS, an electromagnetic wave path such that an antenna connected to the transmitting cell and antennas connected to the one or more receiving cells perform wireless power transmission, and
    transmitting and receiving wireless power between the antenna connected to the transmitting cell and antennas connected to the one or more receiving cells within the waveguide,
    wherein the wavequide has a height corresponding to ½ of the wavelength of the electromagnetic waves transmitted to or received from the antenna.

9. The cell balancing method according to claim 8, wherein the step of determining the transmitting cell and the one or more receiving cells comprises the step of selecting a cell having the highest SOC.

10. The cell balancing method according to claim 8, wherein the step of determining the transmitting cell and the one or more receiving cells comprises the step of selecting the battery cells by a designed number of cells from a cell having the lowest SOC.

* * * * *